July 13, 1948.                S. GUARNASCHELLI                2,444,988
                    SAFETY DEVICE FOR FLEXIBLE TUBINGS
                              Filed Oct. 14, 1943
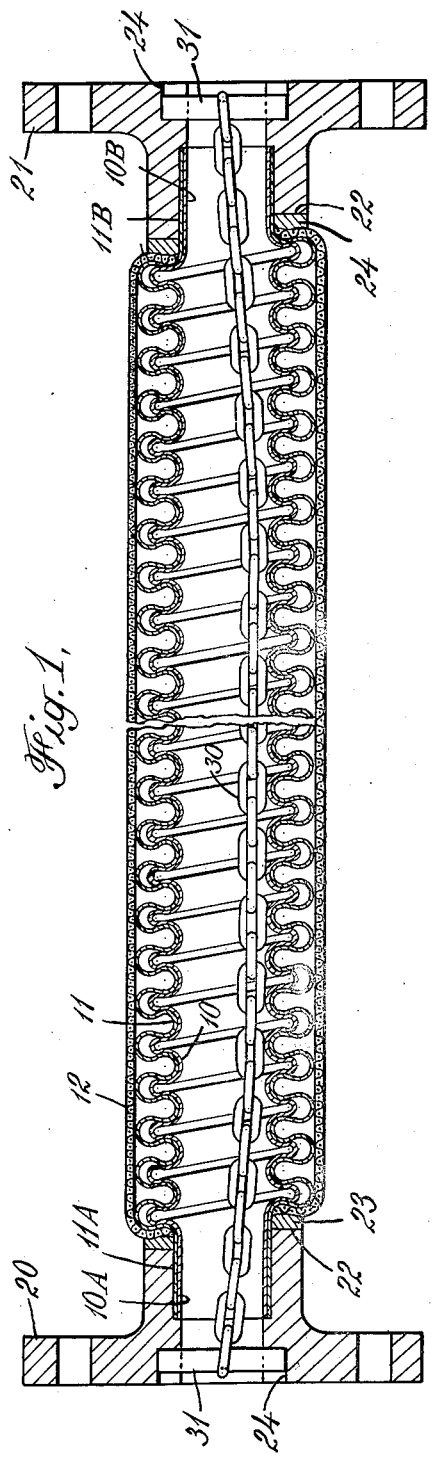
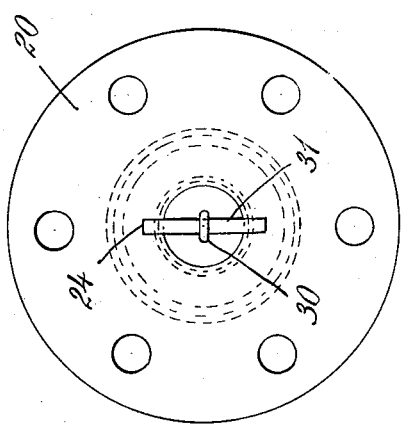
INVENTOR
Stephen Guarnaschelli
BY
E. W. Marshall
ATTORNEY Patented July 13, 1948

2,444,988

UNITED STATES PATENT OFFICE 2,444,988

SAFETY DEVICE FOR FLEXIBLE TUBING

Stephen Guarnaschelli, Mount Vernon, N. Y., assignor to Packless Metal Products Corporation, New Rochelle, N. Y., a corporation of New York Application October 14, 1943, Serial No. 506,145

1 Claim. (Cl. 138—50)

This invention relates to a safety device for flexible tubing and its object is to provide a simple and inexpensive instrumentality for preventing damage which without it might be caused by the rupture of such tubing. Flexible metallic tubing is often used for conducting gases under high pressure and if the pressure exceeds the strength of the tubing to resist it, the tubing will burst and is capable of doing considerable damage by being whipped around by the gas within it. The specific object of this invention is to provide an arrangement which will hold a ruptured tube in substantially its initial position.

A simple embodiment of my invention is shown in the accompanying drawings in which Figure 1 is a sectional side elevation of two parts of a flexible tube of known construction with my safety device applied thereto.

Fig. 2 is an end view of some of the parts shown in Fig. 1.

10 and 11 designate respectively the inner and outer spirally corrugated walls of a flexible tubing of a construction commonly used for conducting fluids under high pressure. 12 is a woven or braided wire jacket on the outer wall 11 and restrains the tube against undue lateral expansion and elongation. The opposite ends 10A, 10B and 11A and 11B of the walls 10 and 11 are cylindrical and fit snugly in counterbores in flanged couplings 20, 21 and are soldered, brazed or otherwise affixed thereto. By means of such couplings adjacent sections of the tubing may be interconnected.

An annular space, such as 22, is left around the cylindrical part of the outer wall 11 between the inner end of each coupling and the proximate corrugation of the outer wall. The ends of the jacket 12 are bent into these spaces and the remainder of the spaces are filled with solder or brazing metal 23. Thus a fluid-tight joint is formed between the tubing walls and the couplings and the jacket 12 is affixed to the couplings and holds them a desired distance apart to resist elongation and also prevents undue lateral expansion. The structure thus described is one of several well known constructions.

According to my invention, a flexible nonextendable member, such as a chain 30, runs through the tubing and is firmly attached to each coupling. A simple way of attaching the ends of the chain to the couplings is shown in the drawings. In this particular form an axially central groove, such as 24, is cut in the outer face of each coupling. Bars 31, 31 are passed through the end links of the chain and are seated in these grooves. The outer edges of the bars may be notched at points in axial alinement with the couplings as shown to receive the chain. The bars are preferably soldered or welded to the couplings and the chains similarly attached to the bars to prevent lateral displacement. The jacket 12 maintains the chain in a slack or loose condition so that it is not a tension member and in the usual employment of the tubing performs no function.

Tubing of the type described is made of ductile material so that if it is ruptured by internal pressure it is not shattered but its break will be more in the nature of a tear. Its broken parts will not be small fragments, but will have sufficient length to surround the chain so that its parts will be held by the chain from flying off or whipping around. Obviously the escaping gas will have no effect upon the chain.

I am aware of the fact that resilient or flexible tension members have been used by others to hold the parts of flexible tubes together and prevent elongation thereof, but believe that I am the first inventor of a safety device like that disclosed herein and that I am entitled to protection on all structural variations and modifications which come within the limitations of the following claim.

What I claim is:

In a flexible tubing having a corrugated wall of ductile material with couplings affixed to its ends, and a substantially non-extensible woven wire jacket surrounding the corrugated wall and also affixed to the couplings to prevent elongation of the tubing; means for preventing lateral displacement of sections of the coupling in case of rupture comprising a flexible substantially non-extensible member longer than the wire jacket extending through the inside of the tubing in a loose condition, with its ends affixed to the couplings.

STEPHEN GUARNASCHELLI.

REFERENCES CITED

The following references are of record in the file of this patent:

UNITED STATES PATENTS

| Number | Name | Date |
|---|---|---|
| 29,113 | Stratton | July 10, 1860 |
| 387,956 | Lanning et al. | Aug. 14, 1888 |
| 401,706 | Legat | Apr. 16, 1889 |
| 983,913 | Lovekin | Feb. 14, 1911 |
| 1,809,874 | Stone | June 16, 1931 |
| 1,845,061 | Schmalz | Feb. 16, 1932 |
| 1,853,681 | Hayes | Apr. 12, 1932 |
| 2,300,547 | Guarnaschelli | Nov. 3, 1942 |

FOREIGN PATENTS

| Number | Country | Date |
|---|---|---|
| 6,521 | Great Britain | Mar. 14, 1914 |
| 200,087 | Germany | July 6, 1908 |
| 357,023 | France | Oct. 25, 1905 |